US011429539B2

(12) United States Patent
Black et al.

(10) Patent No.: US 11,429,539 B2
(45) Date of Patent: *Aug. 30, 2022

(54) SYSTEM, METHOD, APPARATUS, AND COMPUTER PROGRAM PRODUCT FOR PROVIDING A CACHE MECHANISM

(71) Applicant: Groupon, Inc., Chicago, IL (US)

(72) Inventors: Steven Black, Menlo Park, CA (US); Stuart Siegrist, Seattle, WA (US); Gilligan Markham, Auburn, WA (US)

(73) Assignee: Groupon, Inc., Chicago, IL (US)

( * ) Notice: Subject to any disclaimer, the term of this patent is extended or adjusted under 35 U.S.C. 154(b) by 88 days.

This patent is subject to a terminal disclaimer.

(21) Appl. No.: 16/433,570

(22) Filed: Jun. 6, 2019

(65) Prior Publication Data
US 2019/0361817 A1 Nov. 28, 2019

Related U.S. Application Data

(63) Continuation of application No. 14/104,434, filed on Dec. 12, 2013, now Pat. No. 10,360,159.

(51) Int. Cl.
*G06F 12/08* (2016.01)
*G06F 12/128* (2016.01)
*G06F 12/0813* (2016.01)

(52) U.S. Cl.
CPC ........ *G06F 12/128* (2013.01); *G06F 12/0813* (2013.01)

(58) Field of Classification Search
CPC .............................. G06F 12/128; G06F 12/0813
See application file for complete search history.

(56) References Cited

U.S. PATENT DOCUMENTS

| 5,093,777 | A | | 3/1992 | Ryan |
| 5,809,530 | A | | 9/1998 | Samra et al. |
| 6,145,054 | A | * | 11/2000 | Mehrotra ............ G06F 12/0859 711/119 |

(Continued)

OTHER PUBLICATIONS

P. Stellwag, A. Ditter and W. Schroder-Preikschat, "A wait-free queue for multiple enqueuers and multiple dequeuers using local preferences and pragmatic extensions," 2009 IEEE International Symposium on Industrial Embedded Systems, Lausanne, 2009, pp. 237-248.*

(Continued)

*Primary Examiner* — Pierre Michel Bataille
(74) *Attorney, Agent, or Firm* — Alston & Bird LLP

(57) ABSTRACT

Provided herein are systems, methods and computer readable media for providing an out of band cache mechanism for ensuring availability of data. An example system may include a client device configured to, in response to determining requested data is not available in a cache, access the requested data from a data source, transmit, to a cache mechanism, an indication that the requested data is unavailable in the cache, the indication configured to be placed in a queue as an element pointing to the requested data, a cache mechanism configured to receive an indication of requested data, determine whether an element, the element indicative of the requested data, exists in a queue, and in an instance in which the element is not present in the queue, placing the element in the queue, the queue being a list of elements, each indicative of requested data needing to be placed in the cache.

21 Claims, 5 Drawing Sheets

(56) References Cited

U.S. PATENT DOCUMENTS

| | | | |
|---|---|---|---|
| 6,490,652 | B1 | 12/2002 | Van et al. |
| 7,480,657 | B1 * | 1/2009 | Glovin ................ H04L 67/2814 |
| 8,527,696 | B1 | 9/2013 | Clark et al. |
| 8,793,374 | B2 * | 7/2014 | Hesselink ............. H04L 67/125 |
| | | | 709/225 |
| 8,850,118 | B2 * | 9/2014 | Okada ................ G06F 12/0862 |
| | | | 711/118 |
| 10,678,697 | B1 * | 6/2020 | Iyer ....................... G06F 3/0617 |
| 2002/0078302 | A1 | 6/2002 | Favor |
| 2004/0230747 | A1 | 11/2004 | Ims et al. |
| 2008/0022045 | A1 * | 1/2008 | Ali ........................ G06F 9/3814 |
| | | | 711/125 |
| 2010/0030973 | A1 * | 2/2010 | Speight .............. G06F 12/0862 |
| | | | 711/137 |
| 2011/0060881 | A1 | 3/2011 | Gallagher |
| 2011/0145509 | A1 * | 6/2011 | Speight .............. G06F 12/0862 |
| | | | 711/137 |
| 2011/0231612 | A1 | 9/2011 | Karlsson et al. |
| 2011/0320506 | A1 * | 12/2011 | Alvarez ............. G06F 12/0875 |
| | | | 707/812 |
| 2015/0200992 | A1 * | 7/2015 | Houdaille ............... H04L 51/14 |
| | | | 709/219 |

OTHER PUBLICATIONS

U.S. Appl. No. 14/104,434, filed Dec. 12, 2013, U.S. Pat. No. 10,360,159, Issued.

* cited by examiner

SYSTEM, METHOD, APPARATUS, AND COMPUTER PROGRAM PRODUCT FOR PROVIDING A CACHE MECHANISM

CROSS REFERENCE TO RELATED APPLICATION

This application is a continuation of U.S. application Ser. No. 14/104,434, titled "SYSTEM, METHOD, APPARATUS, AND COMPUTER PROGRAM PRODUCT FOR PROVIDING A CACHE MECHANISM" filed Dec. 12, 2013, the content of which is incorporated herein by reference in its entirety.

FIELD

Embodiments of the invention relate, generally, to an out of band cache mechanism for increasing availability of data.

BACKGROUND

Various technologies and techniques exist for providing caching mechanisms attempting to limit database calls, for example, each time a webpage loads, a search is run, or the like. Applicant has identified a variety of problems associated with such conventional technologies and techniques. Through applied effort, ingenuity, and innovation, Applicant has identified various solutions to these problems that are embodied by various embodiments of the invention as herein described.

BRIEF SUMMARY

In general, embodiments of the present invention provided herein include systems, methods and computer readable media for providing out of band cache mechanism for increasing availability of data.

In one embodiment, a method for operating a cache mechanism may be provided, the method comprising receiving an element, the element being an indication of requested data, the requested data having been attempted to be accessed from a cache, and, determined to be not stored in the cache, and instead accessed from a data source, and determining whether the element exists in a queue, the queue being a list of elements, each indicative of requested data needing to be placed in the cache, and in an instance in which the element is not present in the queue, placing the element in the queue.

In some embodiments, the method may further comprise popping the element from the queue, causing the requested data indicated by the element to be loaded into the cache from the data source, and in an instance in which the requested data is loaded into the cache, removing the element from the queue. In some embodiments, the method may further comprise logging an enqueue event in response to placing the element in the queue. In some embodiments, the method may further comprise in an instance in which the element is present in the queue, logging a duplicate request. In some embodiments, the method may further comprise in an instance in which the requested data is not loaded into the cache, logging an error.

In some embodiments, a method for refreshing a cache may be provided, the method comprising determining whether a queue includes at least one element, the element being an indication of requested data, the requested data having been attempted to be accessed from a cache, and, determined to be not stored in the cache, and instead accessed from a data source, in an instance in which the queue includes at least one element, popping a first element from the queue, causing the requested data indicated by the element to be loaded into the cache from the data source, and in an instance in which the requested data is loaded into the cache, removing the element from the queue. In some embodiments, the method may further comprise in an instance in which the queue is determining to be empty, logging an empty queue.

In some embodiments, a device may be provided, the device comprising processing circuitry configured to receive an element, the element being an indication of requested data, the requested data having been attempted to be accessed from a cache, and, determined to be not stored in the cache, and instead accessed from a data source, and determine whether the element exists in a queue, the queue being a list of elements, each indicative of requested data needing to be placed in the cache, and in an instance in which the element is not present in the queue, placing the element in the queue.

In some embodiments, the device may further comprise processing circuitry configured to pop the element from the queue, cause the requested data indicated by the element to be loaded into the cache from the data source, and in an instance in which the requested data is loaded into the cache, remove the element from the queue. In some embodiments, the device may further comprise processing circuitry configured to log an enqueue event in response to placing the element in the queue. In some embodiments, the device may further comprise processing circuitry configured to in an instance in which the element is present in the queue, log a duplicate request. In some embodiments, the device may further comprise processing circuitry configured to in an instance in which the requested data is not loaded into the cache, log an error.

In some embodiments, a device may be provided, the device comprising processing circuitry configured to determine whether a queue includes at least one element, the element being an indication of requested data, the requested data having been attempted to be accessed from a cache, and, determined to be not stored in the cache, and instead accessed from a data source, in an instance in which the queue includes at least one element, pop a first element from the queue, cause the requested data indicated by the element to be loaded into the cache from the data source, and in an instance in which the requested data is loaded into the cache, remove the element from the queue. In some embodiments, the device may further comprise processing circuitry configured to, in an instance in which the queue is determining to be empty, logging an empty queue.

In some embodiments, a computer program product may be provided, the computer program product comprising at least one computer-readable storage medium having computer-executable program code instructions stored therein, the computer-executable program code instructions comprising program code instructions for receiving an element, the element being an indication of requested data, the requested data having been attempted to be accessed from a cache, and, determined to be not stored in the cache, and instead accessed from a data source, determining whether the element exists in a queue, the queue being a list of elements, each indicative of requested data needing to be placed in the cache, and in an instance in which the element is not present in the queue, placing the element in the queue.

In some embodiments, the computer-executable program code instructions further comprise program code instructions for popping the element from the queue, causing the requested data indicated by the element to be loaded into the cache from the data source, and in an instance in which the requested data is loaded into the cache, removing the element from the queue. In some embodiments, the computer-executable program code instructions further comprise program code instructions for logging an enqueue event in response to placing the element in the queue In some embodiments, the computer-executable program code instructions further comprise program code instructions for in an instance in which the element is present in the queue, the method further comprising logging a duplicate request In some embodiments, the computer-executable program code instructions further comprise program code instructions for in an instance in which the requested data is not loaded into the cache, logging an error.

In some embodiments, a computer program product may be provided, the computer program product comprising at least one computer-readable storage medium having computer-executable program code instructions stored therein, the computer-executable program code instructions comprising program code instructions for determining whether a queue includes at least one element, the element being an indication of requested data, the requested data having been attempted to be accessed from a cache, and, determined to be not stored in the cache, and instead accessed from a data source, in an instance in which the queue includes at least one element, popping a first element from the queue, causing the requested data indicated by the element to be loaded into the cache from the data source, and in an instance in which the requested data is loaded into the cache, removing the element from the queue. In some embodiments, the computer-executable program code instructions further comprise program code instructions for in an instance in which the queue is determining to be empty, logging an empty queue.

In some embodiments, a system may be provided, the system comprising a client device configured to, in response to determining requested data is not available in a cache, access the requested data from a data source, transmit, to a cache mechanism, an indication that the requested data is unavailable in the cache, the indication configured to be placed in a queue as an element pointing to the requested data. In some embodiments, the system may further comprise a cache mechanism configured to receive an indication of requested data, the requested data having been attempted to be accessed from a cache, and, determined to be not stored in the cache, and instead accessed from a data source, determine whether an element, the element indicative of the requested data, exists in a queue, and in an instance in which the element is not present in the queue, placing the element in the queue, the queue being a list of elements, each indicative of requested data requested, by one or more client devices, to be placed in the cache.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Figure 1:
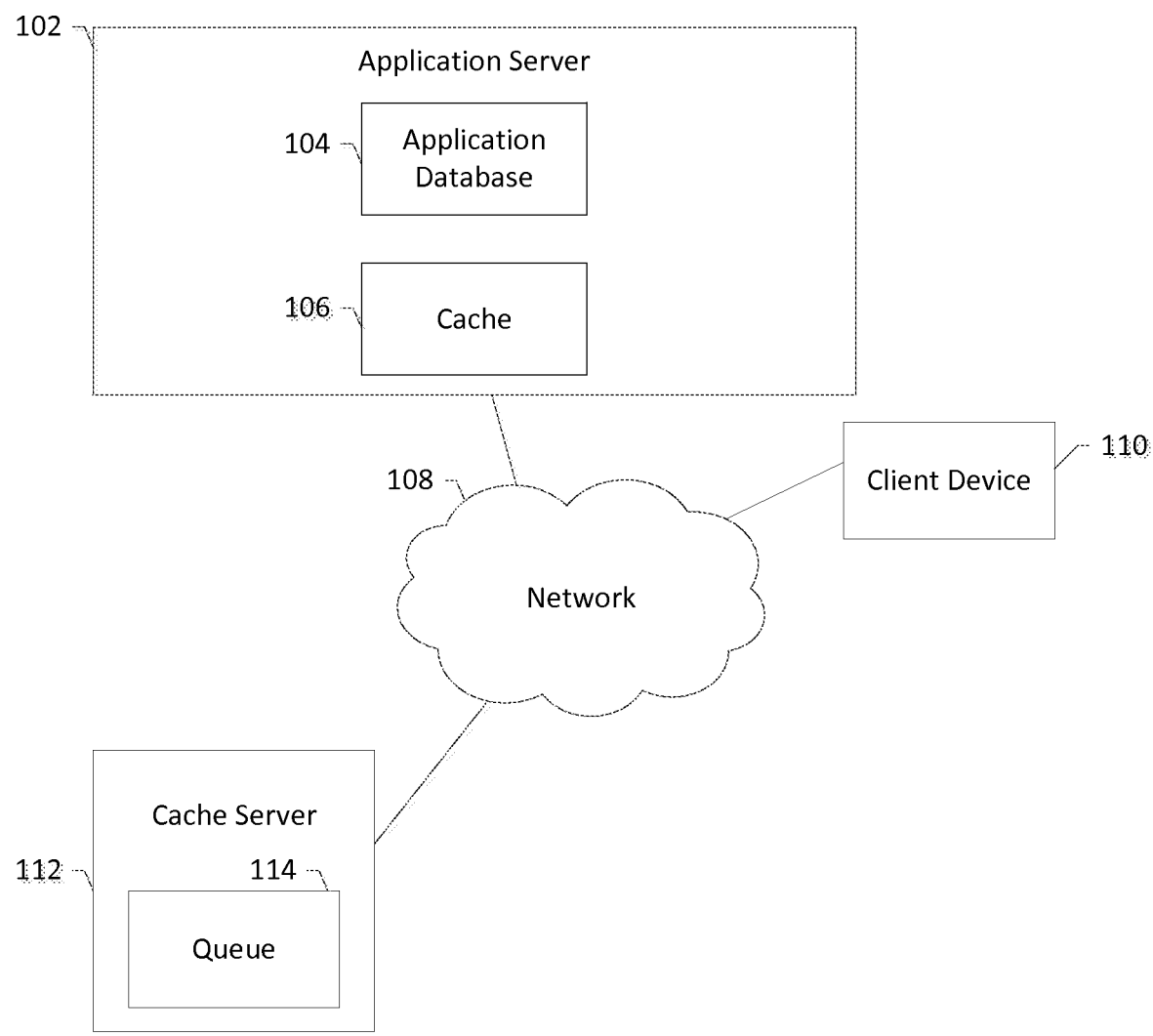
FIG. 1 is block diagram of a system that is configured to provide a caching mechanism, in accordance with an example embodiment.

Embodiments of the present invention now will be described more fully hereinafter with reference to the accompanying drawings, in which some, but not all embodiments of the inventions are shown. Indeed, embodiments of the invention may be embodied in many different forms and should not be construed as limited to the embodiments set forth herein; rather, these embodiments are provided so that this disclosure will satisfy applicable legal requirements. Like numbers refer to like elements throughout.

Definitions

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, and/or the like.

In some embodiments, a host system may be implemented as a promotional system to offer promotions to a consumer. A promotion and marketing service may utilize a host system, such as a promotional system, to offer such promotions. A "promotion and marketing service" may provide promotion and/or marketing services on behalf of one or more providers (e.g., one or more merchants, retailers, etc.) that are offering one or more instruments that are redeemable for goods, services, experiences and/or the like. The promotion and marketing service is further configured to illustrate or otherwise inform one or more consumers of the availability of one or more instruments in the form of one or more impressions. In some examples, the promotion and marketing service may also take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like.

A "promotion" may be a deal purchased by a consumer from a promotional system, and may be considered an agreement for a particular provider to provide a service or good (e.g., a discounted service or good) to the consumer. A promotion may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. An example promotion may be a deal offer whereby a running shoes company or intermediary (e.g., promotion provider) offers $50 of value toward the purchase of running shoes in exchange for $25. In some examples, the promotion defines an accepted value (e.g., a cost to purchase the promotion), a promotional value (e.g., the value of the resultant instrument beyond the accepted value), a residual value (e.g., the value upon return or upon expiry of one or more redemption parameters), one or more redemptions parameters and/or the like. For example, and using the running shoes company promotion as an example, the accepted value is $25 and the promotional value is $50. In this example, the residual value may be equal to the accepted value.

An "instrument" associated with a promotion may include, but is not limited to, any type of gift card, tender, electronic certificate, medium of exchange, voucher, or the like that embodies the terms of the promotion from which the instrument resulted and may be used toward at least a portion of the purchase, acquisition, procurement, consumption or the like of goods, services and/or experiences. In some examples, the instrument may take the form of tender that has a given value that is exchangeable for goods, services and/or experiences and/or a reduction in a purchase price of a particular good, service or experience. In some examples, the instrument may have multiple values, such as an accepted value, a promotional value and/or a residual value. For example, using the aforementioned running shoes company as the example provider, an electronic indication in a mobile application that shows $50 of value to spend at the running shoes company. In some examples, the accepted value of the instrument is defined by the value exchanged for the instrument. In some examples, the promotional value is defined by the promotion from which the instrument resulted and is the value of the instrument beyond the accepted value. In some examples, the residual value is the value after redemption, the value after the expiry or other violation of a redemption parameter, the return or exchange value of the instrument and/or the like.

A "provider" may be considered a merchant, retailer, or other provider of goods or services that offers a promotion, as agreed upon with the promotion and marketing service affiliated with the promotional system. A provider may include, but is not limited to, a merchant, business owner, consigner, shopkeeper, tradesperson, vender, operator, entrepreneur, agent, dealer, retailer, organization or the like that is in the business of a providing a good, service or experience to a consumer, facilitating the provision of a good, service or experience to a consumer and/or otherwise operating in the stream of commerce. For example, a provider may the form of a running shoes company that sells attire that is generally used by a person who runs or participates in athletic activities.

An "impression" may be considered a communication advertising an offer to purchase a promotion from a promotional system. An impression may include a communication, a display, or other perceived indication, such as a flyer, print media, e-mail, text message, application alert, mobile applications, other type of electronic interface or distribution channel and/or the like, of one or more promotions. For example, and using the aforementioned running company as the example provider, an e-mail communication sent to consumers that indicates the availability of a $25 for $50 toward running shoes promotion.

Impressions are therefore provided to "consumers," including, but not limited to, a client, customer, purchaser, shopper, user of the promotional system or the like who may be in the position to or does exchange value for one or more instruments under the terms defined by the one or promotions. For example, and using the aforementioned running shoes company as the example provider, an individual who is interested in purchasing running shoes.

Analyzing "explicit data," such as user-provided data in user profiles, preferences, and/or promotion purchase history, for example, may allow the promotional system to better target promotion types or impressions to consumers. A consumer may be more likely to purchase a promotion if the impression advertising the promotion is of interest to the consumer than if the associated promotion was selected at random.

Additionally or alternatively, accessing "implicit data," data that may be user-provided for a purpose other than for use on the promotional system and/or detected by the promotional system, may allow a promotional system to gather information on consumer behaviors, preferences and preferred locations. Example implicit data may include data indicative of a consumer's browsing history, detected location, or the consumer's social network profile information, for example.

A "client device" may be a device or module operable to access a website (e.g., perhaps using a web browser) or execute a mobile application, such as a laptop, mobile phone, tablet, personal computer, or the like. A client device may place a request, such as in response to a consumer activity facilitated by a user interface such as, without limitation, clicking a link, selecting particular text or image data, and/or inputting or entering data.

As will be apparent to one of ordinary skill in the art in view of this disclosure, users may access content provided by a host system in a variety of ways. For example, a consumer may use a web browser to visit a website operated by a promotion and marketing service and hosted via a host system. In addition, the user may use a mobile application (e.g., a software application or "app") to access promotion provider content hosted by the host system.

In some embodiments, "element", "job", "event", "item" may be used similarly throughout the following description. One of ordinary skill in the art would appreciate any differences, as related to what the client device provides to the cache mechanism, what the cache mechanism stores in the queue, and what the cache mechanism provides to the service responsible for loading the cache with updated data. For example, an element may be a unit of data defined for processing. A data element may be defined by size and type (e.g., alphanumeric, numeric only, true/false, date, etc.); a job may be a unit of work defined by a user that is to be accomplished by a computer; element may be an action or occurrence (e.g., user input) detected by a program that may be handled by the program; and item may be any unit of data stored in a field.

Brief Overview

The methods, apparatus and computer program products described herein are operable for providing out of band cache mechanism for ensuring availability of data. For example, in an instance in which the client device transmits a request to the cache, and in the event that the requested data is not in the cache, the client device may provide data to the cache mechanism. The data may be, in effect, a request for a cache update, and may be in the form of an identifier (e.g., a uniform resource indicator or other linking mechanism that identifies the location or otherwise directs a device to the data) related to the requested data. The cache mechanism is configured to queue the identifiers (e.g., elements) and update the cache based on the queued elements. As such, the cache mechanism handles the queuing and processing of the cache updates.

Figure 2:
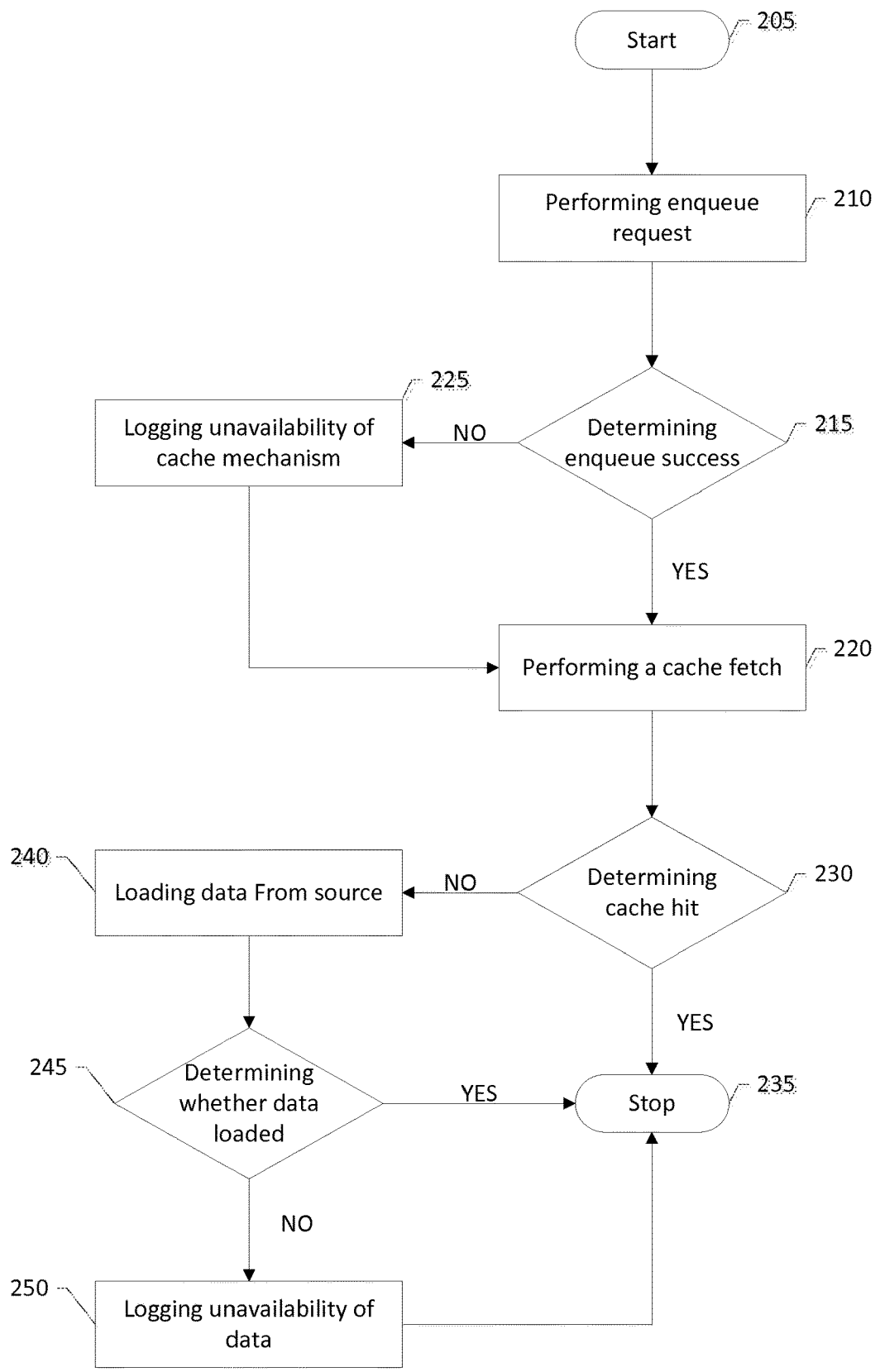
FIG. 2 is a flowchart illustrating a logging process, in accordance with an example embodiment.
Figure 3:
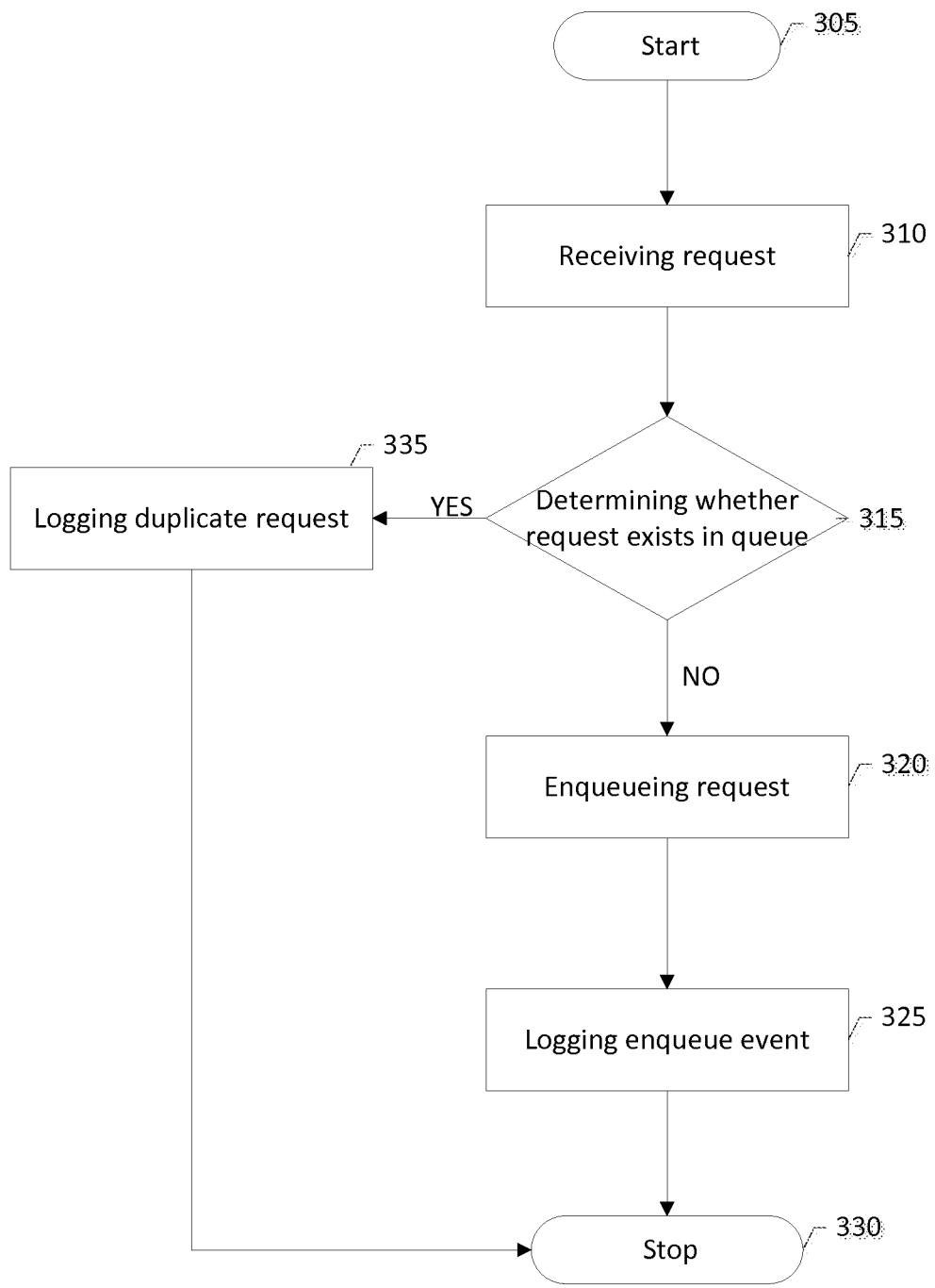
FIG. 3 is a flowchart illustrating a method for receiving a request in accordance with an example embodiment.
Figure 4:
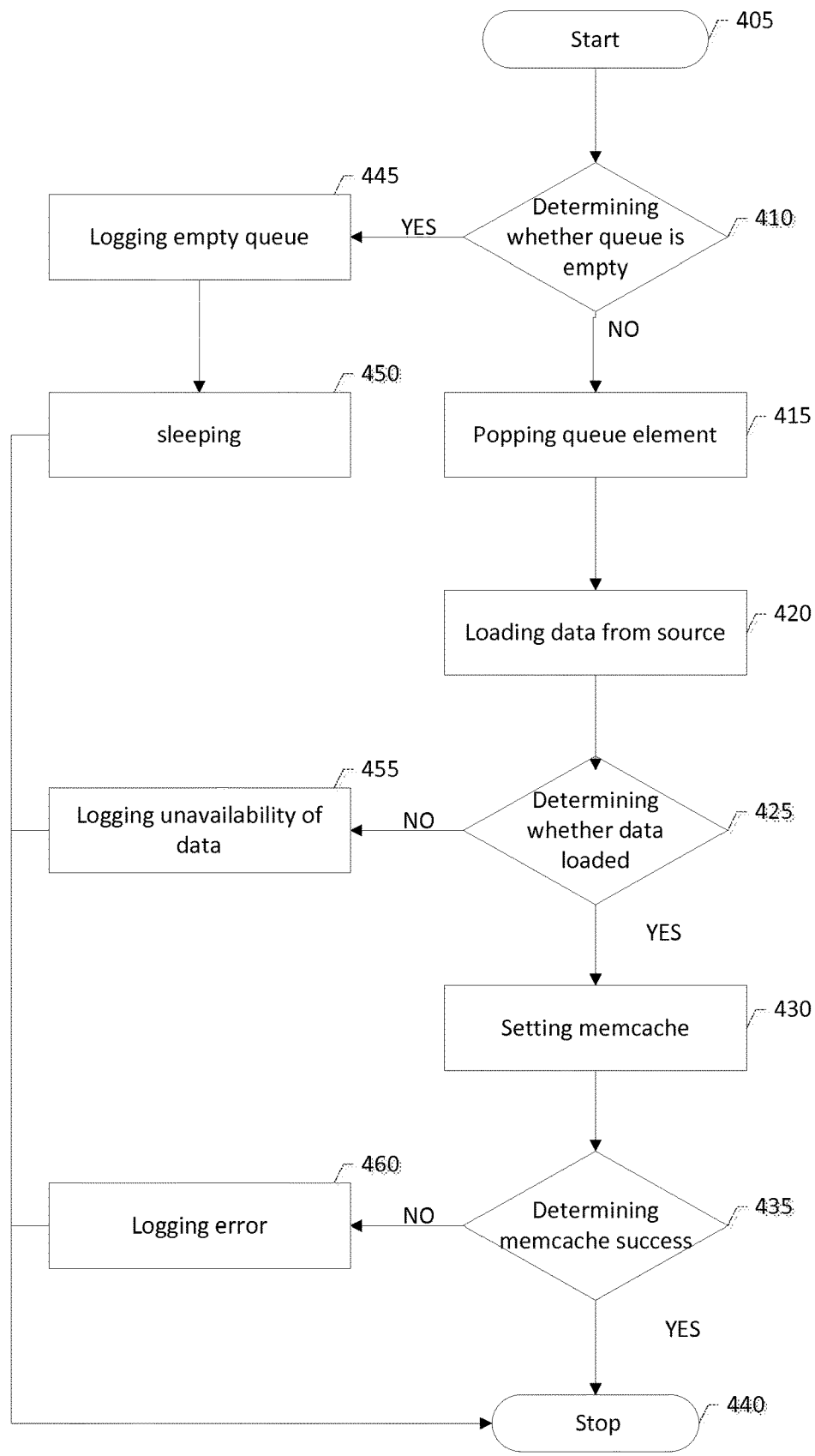
FIG. 4 is a flowchart illustrating a method for refreshing a cache in accordance with an example embodiment.

Metrics related to the performance of the cache mechanism are also described herein. A logging process is shown in FIG. 2 for tracking the number of evictions from the queue and how frequently the queue is updated. A receiving process, that may be implemented by the cache mechanism, is shown in FIG. 3 for receiving an element from the client device, determining if the element is in the queue (e.g., a request to refresh the cache is still pending), and if the element does not exist, adding the element to the queue for processing. The queue may then be read continuously in the order of insertion. FIG. 4 shows a refresh process. Each element of the queue may be processed using an asynchronous call to a service responsible for loading the data. When the services have returned successfully, the element may be updated and/or removed from the queue.

As described in greater detail below, various embodiments of the invention provide solutions for reducing a size of the queue such as by eliminating duplication of lookups. Such embodiments are further configured to provide for easy configuration of multiple client injection paths, keep active elements "fresh", eliminate or reduce "dog piling" on cache miss, provide a single point for establishing cache policy, support efficient preemptive caching, provide a single point for refresh rate activity, support multiple concurrent request/refresh servers, provide a configuration driven for flexible cache object definitions, and auto-tune cache timeouts based on queue length and rate.

Example System Architecture

FIG. 1 is a block diagram showing an exemplary system 100 for providing out of band cache mechanism for ensuring availability of data.

FIG. 1 shows system 100 including an example network architecture, which may include one or more devices and sub-systems that are configured to implement some embodiments discussed herein. For example, system 100 may include application server 102, which may include, for example, application database 104 and a cache 106, among other things (not shown). Application server 102 may be any suitable network server, a plurality of networked servers, and/or other type of processing device. Application database 104 may be any suitable network database configured to store information that may be used to facilitate the techniques as discussed herein. In this regard, application server 102 may include, for example, at least one backend data server, network database, cloud computing device, among other things.

Application server 102 may be coupled to one or more client devices (e.g., client device 110) and an out of band cache mechanism, such as for example, cache mechanism 112, via network 108. In this regard, network 108 may include any wired or wireless communication network including, for example, a wired or wireless local area network (LAN), personal area network (PAN), metropolitan area network (MAN), wide area network (WAN), mobile broadband network, or the like, as well as any hardware, software and/or firmware required to implement it (such as, e.g., network routers, etc.). For example, network 108 may include a cellular telephone, an 802.11, 802.16, 802.20, and/or WiMax network. Further, the network 108 may include a public network, such as the Internet, a private network, such as an intranet, or combinations thereof, and may utilize a variety of networking protocols now available or later developed including, but not limited to TCP/IP based networking protocols.

As discussed above, client device 110 may be associated with any device operable to access the application server 102. As such, client device 110 may include a personal computer and/or other networked device, such as a cellular phone, tablet computer, mobile device, etc., that may be used for any suitable purpose.

Furthermore, cache mechanism 112 may include queue 114. Together, the cache mechanism 112 and the queue 114 provide an out of band cache mechanism for ensuring "freshness" and availability of data. Elements of queue 114 may be updated as determined by a dynamic configuration and may be manually requested by external clients without duplication of lookups. In some embodiments, all elements may be stored in a language agnostic format to allow for maximum compatibility and reuse.

In one embodiment, cache 106 may be configured to function as a promotion cache and cache mechanism 112 may be configured to receive elements and/or requests indicative of requested promotion data, the requested promotion data having been requested by the client device 110 to be accessed from cache 106, and, determined to be not stored in the cache 106, and instead accessed from the data source, such as application database 104. In other embodiments, however, cache 106 may be configured to store other content, which may for example, include any other relatively static content which may be stored for a, for example, short period of time (e.g., deal catalog, orders, vouchers, taxonomy, SEO, and divisions). As such cache mechanism 112 may be configured to receive elements indicative of requested data, the requested data having been attempted to be accessed from a cache, and, determined to be not stored in the cache, and instead accessed from a data source.

In some embodiments, the out of band cache mechanism, such as for example, cache serve 112 may be implemented using a library comprising asynchronous non-blocking calls, a message bus for scaling, and fast performance (e.g., Vertx.io server). In some embodiments, cache mechanism 112 may include additional model-view-controller (MVC) architecture for rendering views.

Returning now to FIG. 1, in some configurations, to avoid introducing unnecessary latency or reducing availability to customer facing services, an application program interface (API) may be provided asynchronously, which allows a website or mobile application service to interact with the application server 102 via the queue 114 in an asynchronous manner. In some embodiments, however, the application server 102 may be configured such that one or more APIs may be provided synchronously. In such configurations, the synchronous configuration of the system may provide feedback to the client device(s), allowing the client device(s) to make certain determinations as discussed in greater detail below.

Queue 114 may be configured to provide timely updates and reduce or eliminate duplication of lookups. In some embodiments, cache mechanism 112 and queue 114 (e.g., Vertx.io server with a Redis instance) may be configured for queuing elements to be uploaded and deduputicated lookups using, for example, zsets and key lookups. In some embodiments, loading the data into the queue may include making calls to designated endpoints in the API allowing cache mechanism 112. In some examples, such an API may be used to leverage the existing logic and prevent code fragmentation. In some embodiments, the JSON format returned by the API may be used as the standard storage format, for example, because of the broad support across languages for this format and reduction of additional manipulation of the data.

The ephemeral storage for the loaded data may be memcached when for example, memcaching may already be utilized throughout the API for the current performance caching for creating the easiest path for migrating to use the new caching system and/or the like. Memcached may be a distributed memory caching system that may be used to speed up dynamic database-driven websites by caching data and objects in RAM to reduce the number of times an external data source (such as a database or API) must be read. Another benefit, in some example, is the ability to utilize the existing set of API memcached servers as the base for storing the data.

Logging Process

In some embodiments, metrics related to the out of band cache mechanism may be related to the cache store itself. The metrics may be derived from a logging process that may be configured for tracking the number of evictions and how frequently keys are updated. In some embodiments, an amount of time necessary to load the items into the cache may be tracked as a metric for determining performance issues with the services.

FIG. 2 shows an example process that may, in some embodiments, be executed by client device 110. The exemplary processes shown below allow various embodiments of the present invention for logging the performance (e.g., metrics) of the cache mechanism. For example, in some embodiments, in order for the cache server to be of any use it needs clients to initiate the loading of the cache. The cache mechanism may have one or more types of clients (e.g., direct clients and passive clients). Direct clients which call the cache mechanism when they are unable to find data in the cache, may take the form of an API. For example, if the API is unable to load a supported element from the cache, it may cause a request to be transmitted to the cache mechanism to refresh the cache while continuing to load the resource manually. Passive clients may listen to the message bus and transmit requests to the cache mechanism when they see elements created or updated. The process may help reduce stale data and allow the cache duration to be set for longer periods, because for example, the stale data is updated when changes occur.

As shown in block 205 of FIG. 2, an apparatus, such as client device 110 or application server 102, may be configured for starting, for example, a client process (e.g., executed on the client device). As shown in block 210 of FIG. 2, an apparatus, such as client device 110 or application server 102, may be configured for performing an enqueue request.

In various embodiments, in the logging process shown in FIG. 2, it may be determined whether a call to the cache mechanism is successful. As such, as shown in block 215 of FIG. 2, an apparatus, such as client device 110 or application server 102, may be configured for determining success of the cache mechanism call.

In an instance in which success is determined, an apparatus, such as client device 110 or application server 102, may be configured for performing a cache fetch, as shown in block 220 of FIG. 2. However, in an instance in which success is not determined in block 215, an apparatus, such as client device 110 or application server 102, may be configured for logging the cache mechanism unavailable, as shown in block 225 of FIG. 2. If, for example, an API is unable to load a supported element from the cache, it will cause a request to be transmitted to the cache mechanism to refresh the cache and may then continue loading the data manually. As such, once a success is determined or unavailability of the cache mechanism is logged the process may proceed to block 230.

In various embodiments, a determination of whether the requested data is contained in the cache (e.g., cache hit) is performed. As such, as shown in block 230 of FIG. 2, an apparatus, such as client device 110 or application server 102, may be configured for determining whether the requested data is contained in the cache.

In an instance in which the requested data is contained in the cache, an apparatus, such as client device 110 or application server 102, may be configured for proceed to block 235. As shown in block 235 of FIG. 2, an apparatus, such as client device 110 or application server 102, may be configured for stopping the client process.

In an instance in which the requested data is not contained in the cache (e.g., cache miss) in block 230, an apparatus, such as client device 110 or application server 102, may be configured for loading data from data source (e.g., application database 104), as shown in block 240 of FIG. 2. For example, in the event of a cache miss, the data may have to be fetched from its original storage location, which is comparatively slower. Hence, the greater the number of requests that can be served from the cache, the faster the overall system performance becomes, in some examples.

As shown in block 245 of FIG. 2, an apparatus, such as client device 110 or application server 102, may be configured for determining whether the data was loaded. In an instance in which the data was loaded at block 245, the process proceeds to block 235, where process is stopped. In an instance in which the data was not loaded, the process proceeds to block 250. As shown in block 250 of FIG. 2, an apparatus, such as client device 110 or application server 102, may be configured for logging that the data was not found. The process then proceeds to block 235 where the process is stopped.

Receiving

In some embodiments, the cache mechanism may be configured to load its configuration without requiring a restart. Configuration may be controlled via a collection of files which are deployed in a separate project allowing the deployment of updated configuration files without redeploying the entire project. In some embodiments, to activate the new configuration, an administrative port may be used which will reload the configuration files when a request is received. One benefit of using an administrative port over detecting file changes may be the increase in control over how the files are loaded and when the files are loaded.

The cache mechanism 112 may receive a request to update one or more elements. The lookup uniform resource identifier (URI) for these elements may then be registered in a configuration file which is dynamically loaded. The cache status of these elements may not be a factor in determining eligibility for refresh. In some embodiments, such as for example when the cache mechanism is utilized as an internal only service, use of use secure sockets layer (SSL) or an open source for authorization (e.g., oauth) for securing the endpoint is not needed. The cache mechanism does not return the data requested to be refreshed as part of the response thus eliminating any data security issue.

Each element may be checked against the queue 114 to see if there is an existing refresh request still pending. If an existing refresh request does not exist, then an identifier key will be added to queue 114 and the element will be queued for processing. The status of whether the identifier key is already pending or not may be logged. In some embodiments, statistics or metrics may be reported for further processing and ultimate presentation or display. In some embodiments, a problem for particular elements which are not being loaded from the cache may be determined. In some embodiments, such processes may detect issues with a dequeue process and/or identify elements which are changing frequently.

FIG. 3 shows an example method that may be executed by one or more machines, such as, for example cache mechanism 112 of FIG. 1, for receiving a request, in accordance with some embodiments discussed herein. The exemplary process shown below for starting a session may allow easy coordination of multiple client injection paths and eliminate the dog piling on cache miss.

As shown in block 305 of FIG. 2, an apparatus, such as cache mechanism 112, may be configured for starting a cache mechanism request process, which is shown below. As shown in block 310 of FIG. 2, an apparatus, such as cache mechanism 112, may be configured for receiving a request to, for example, update the cache. In some embodiments, the request is an element, the element being an indication of requested data, the requested data having been attempted to be accessed from a cache by the client device, and, determined, by the client device, to be not stored in the cache, and instead accessed from a data source. In some examples, the requested element may take the form of a promotion or grouping of promotions.

In some embodiments, a determination may then be made as to whether the element exists in the queue. As such, as shown in block 315 of FIG. 2, an apparatus, such as cache mechanism 112, may be configured for determining if the element exists in the queue. In an instance in which the request is determined to exist in the queue, the process proceeds to block 320. As shown in block 320 of FIG. 2, an apparatus, such as cache mechanism 112, may be configured for enqueueing the element. Subsequently, as shown in block 325 of FIG. 2, an apparatus, such as cache mechanism 112, may be configured for logging the enqueuing event. Once the enqueuing event is logged, as shown in block 330 of FIG. 2, an apparatus, such as cache mechanism 112, may be configured for stopping the cache mechanism 112 request process.

Returning now to the determination in block 315, in an instance in which the element is determined not to exist in the queue, the process proceeds to block 335. As shown in block 335 of FIG. 2, an apparatus, such as cache mechanism 112, may be configured for logging the duplicate request. After logging the duplicate request, the process proceeds to block 330, where the cache mechanism 112 request process ends.

Refreshing

In some embodiments, the cache mechanism may utilize elements of the queue to determine with which data to load the cache. In order to determine which data with which to load the cache and in what order, the cache mechanism may read the queue continuously in the order of insertion. Each job (e.g., the loading of the data indicated by the element or identified by an identifier key) may be processed using an asynchronous call to the registered service responsible for loading the data. The cache mechanism may, in some embodiments, be configured to control a rate of execution. In some embodiments, multiple instances of cache mechanism 112 may be processing the queue in parallel, for example, if a load requires such processing. The element being loaded and the corresponding status and metrics of the service responsible for loading the element will be logged. In some embodiments, the status and metrics may be visible through software applications, such as splunk and monitord. When the services have returned successfully, the element data may be updated in memcached and the job will be removed from the queue.

FIG. 4 shows an example method that may be executed by one or more machines, such as, for example cache mechanism 112 of FIG. 1, for refreshing the cache, in accordance with some embodiments discussed herein. The exemplary process shown below for refreshing the cache may aid in the keeping of the cache "fresh" and supporting efficient pre-emptive caching. This determination may allow for the support of multiple concurrent request/refresh servers.

As shown in block 410 of FIG. 4, an apparatus, such as cache mechanism 112, may be configured for starting a cache mechanism refreshing process.

In some embodiments, a determination is made of whether there are items in the queue. As such, as shown in block 410 of FIG. 4, an apparatus, such as cache mechanism 112, may be configured for determining whether items (e.g., elements or requests) are present in the queue. In an instance in which items, such as elements, are present in the queue, the process proceeds to block 415. As shown in block 415 of FIG. 4, an apparatus, such as cache mechanism 112, may be configured for popping an item. Next, as shown in block 420 of FIG. 4, an apparatus, such as cache mechanism 112, may be configured for loading the data from source.

In some embodiments, a determination may be made whether the data was loaded from the data source. As such, as shown in block 425 of FIG. 4, an apparatus, such as cache mechanism 112, may be configured for determining whether the data was loaded from the data source. In an instance in which the refresh process determines that data was loaded from the data source, the process proceeds to block 430. As shown in block 430 of FIG. 4, an apparatus, such as cache mechanism 112, may be configured for setting the memcache.

A determination may then be made of whether the setting of the memcache was a success. As such, as shown in block 435 of FIG. 4, an apparatus, such as cache mechanism 112, may be configured for determining whether the setting was a success. In an instance where the determination yields that the setting was a success, the process proceeds to block 440. As shown in block 440 of FIG. 4, an apparatus, such as cache mechanism 112, may be configured for stopping the cache mechanism refresh process.

Returning to the determination of block 410, in an instance in which the determination yields a result that no items are in the queue, the process proceeds to block 445. As shown in block 445 of FIG. 4, an apparatus, such as cache mechanism 112, may be configured for logging an empty queue. Once the logging of the empty queue, the process proceeds to block 450. As shown in block 450 of FIG. 4, an apparatus, such as cache mechanism 112, may be configured for sleeping. The process may then proceed to block 440 where the cache mechanism refresh process is stopped.

Returning to the determination of block 425, in an instance in which the determination yields that the data was not loaded from the data source, the process proceeds to block 455. As shown in block 455 of FIG. 4, an apparatus, such as cache mechanism 112, may be configured for logging that the data was not found. From there, the process may proceed to block 440 where the cache mechanism refresh process is stopped.

Returning to the determination of block 435, in an instance in which the setting of the memcache was not a success, the process proceeds to block 460. As shown in block 460 of FIG. 4, an apparatus, such as cache mechanism 112, may be configured for logging a memcache error. From there, the process may proceed to block 440 where the cache mechanism refresh process is stopped.

In some embodiments, caching expirations times may be dynamically adjusted based on a queue load and/or max refresh rate. For example, if the max refresh rate is 1,000/min and the queue has 10,000 items in it, a 10 minute expiration policy is required. However, if the queue later drops to a steady state of 500 elements (e.g., 500 identifier keys, or elements of the queue, each indicating request data), then the expiration policy may be reduced to a "floor" value.

The cache mechanism may also be utilized to "pre-heat" caches, for example, in the event of a systemic restart. Depending on the data being cached, enqueued elements may be retained & replayed to heat the cache. For example, if the cache mechanism 112 retains the last 10,000 items that have been enqueued, it could then replay those elements to quickly populate the cache into a heated state. In some embodiments, future refresh dates may be assigned. One benefit of assigning refresh dates may be in the scheduling updates based on a predictable or well-defined refresh policy. This may allow clients to specify a refresh to occur based on a fixed date/time. In some embodiments, as part of a setup process, the cache mechanism may be configured to write elements into multiple caches. In some embodiments, therefore, the cache may be mirrored for local or multi-region failover.

Computing Device Architecture

Figure 5:
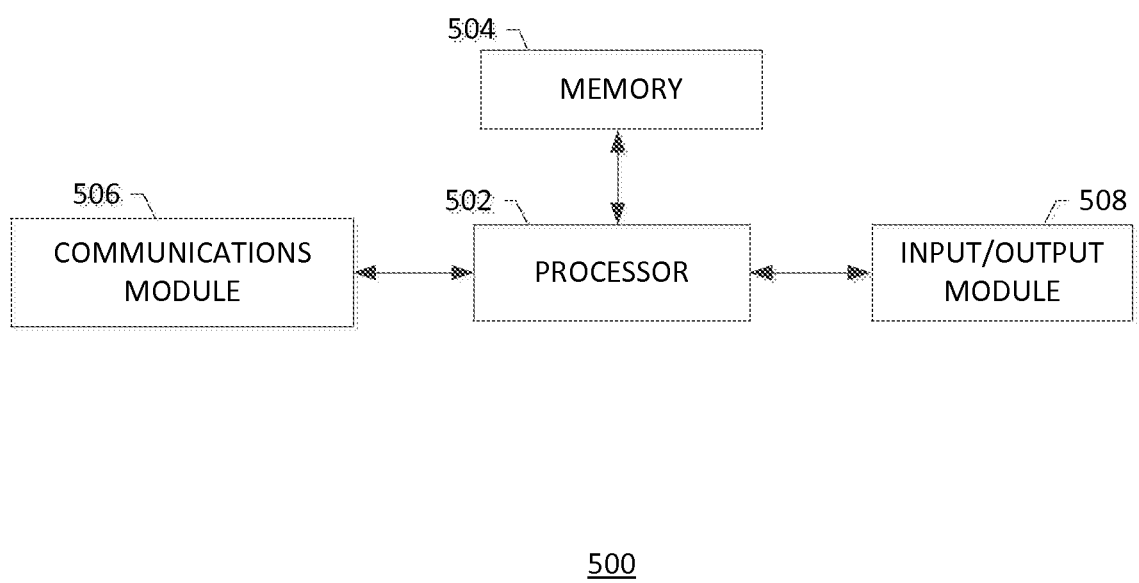
FIG. 5 is a block diagram of an apparatus that may be specifically configured in accordance with an example embodiment of the present invention.

In some embodiments of the present invention, an apparatus, such as application server 102, client device 110, or cache mechanism 112 may be embodied by a computing device. The computing device may include or be associated with an apparatus 500 as shown in FIG. 5. In this regard, the apparatus may include or otherwise be in communication with a processor 502, a memory device 504, a communication interface 506 and a user interface 508. As such, in some embodiments, although devices or elements are shown as being in communication with each other, hereinafter such devices or elements should be considered to be capable of being embodied within the same device or element and thus, devices or elements shown in communication should be understood to alternatively be portions of the same device or element.

In some embodiments, the processor 502 (and/or co-processors or any other processing circuitry assisting or otherwise associated with the processor) may be in communication with the memory device 504 via a bus for passing information among components of the apparatus. The memory device may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus 500 to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 500 may be embodied by the client device 110 or cache mechanism 112 configured to employ an example embodiment of the present invention. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 502 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 502 may be configured to execute instructions stored in the memory device 504 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a head mounted display) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor. In one embodiment, the processor may also include user interface circuitry configured to control at least some functions of one or more elements of the user interface 508.

Meanwhile, the communication interface 506 may be any means such as a device or circuitry embodied in either hardware or a combination of hardware and software that is configured to receive and/or transmit data between the client device 110 and a server, such as for example application server 102. In this regard, the communication interface 506 may include, for example, an antenna (or multiple antennas) and supporting hardware and/or software for enabling communications wirelessly. Additionally or alternatively, the communication interface may include the circuitry for interacting with the antenna(s) to cause transmission of signals via the antenna(s) or to handle receipt of signals received via the antenna(s). For example, the communications interface may be configured to communicate wirelessly with the head mounted displays 10, such as via Wi-Fi, Bluetooth or other wireless communications techniques. In some instances, the communication interface may alternatively or also support wired communication. As such, for example, the communication interface may include a communication modem and/or other hardware/software for supporting communication via cable, digital subscriber line (DSL), universal serial bus (USB) or other mechanisms. For example, the communication interface may be configured to communicate via wired communication with other components of the computing device.

The user interface 508 may be in communication with the processor 502, such as the user interface circuitry, to receive an indication of a user input and/or to provide an audible, visual, mechanical, or other output to a user. As such, the user interface may include, for example, a keyboard, a mouse, a joystick, a display, a touch screen display, a microphone, a speaker, and/or other input/output mechanisms. In some embodiments, a display may refer to display on a screen, on a wall, on glasses (e.g., near-eye-display), in the air, etc. The user interface may also be in communication with the memory 504 and/or the communication interface 506, such as via a bus.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

In a typical embodiment, apparatus 500 interacts via the network 108 via a communications interface 506 with client devices 110. The network 108 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication between remotely situated humans and/or devices. In this regard, the communications interface 506 may be capable of operating with one or more air interface standards, communication protocols, modulation types, access types, and/or the like.

In an example embodiment, components/modules of application server 102 or cache mechanism 112 may be implemented using standard programming techniques. For example, application server 102 or cache mechanism 112 may be implemented as a "native" executable running on the processor 502, along with one or more static or dynamic libraries. In other embodiments, application server 102 or cache mechanism 112 may be implemented as instructions processed by a virtual machine that executes as one of other programs. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use either well-known or proprietary synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of the system 100, can be made available by standard mechanisms such as through C, C++, C#, and Java APIs; libraries for accessing files, databases, or other data repositories; through languages such as XML; or through Web servers, FTP servers, or other types of servers providing access to stored data. A data store may also be included and it may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the application server 102 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Some or all of the system components and data structures may also be stored as a web application, "app", or any HTML5 or JavaScript™ application, such as a computer software application that is coded in a browser-supported programming language (such as JavaScript™) combined with a browser-rendered markup language like HTML5, reliant on a common web browser to render the application executable. The opening of a web page, "mobile app", or "app" may be performed by a web browser on a mobile client device. An HTML5 or JavaScript™ "app" allows web page script to contact a server for storing and retrieving data without the need to re-download an entire web page. Some or all of the system components and data structures may also be stored as a privileged web application or privileged web app. A privileged web app is a piece of web content that may have been verified by, for example, means of an app store or stores or may have obtained or downloaded from a source that is trusted source. A trusted source may provide a privileged web app that may be enabled to override the default power settings. Such computer program products may also take other forms in other embodiments. Accordingly, embodiments of this disclosure may be practiced with other computer system configurations.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method comprising:
receiving, from a client device, at a first time, a request to load a data element;
checking the data element against a cache;
in response to determining that the data element is not available in the cache:
(1) accessing the data element from an application database; and transmitting an element to the client device, the element being responsive to the request from the client device for the data element, the data element having been (i) attempted to be accessed from the cache, (ii) determined not to be stored in the cache, and, (iii) accessed from the application database; and
(2) preemptive caching, wherein preemptive caching comprises: subsequent to determining that the data element is not available in the cache and in parallel to the accessing and transmitting steps, transmitting, to a cache mechanism, an indication that the data element is unavailable in the cache, the indication configured to cause an identifier keto be added to a queue, the queue stored in the cache mechanism, causing the data element to be queued for retrieval from the application database and later stored in the cache, the queue being a list of one or more other identifier keys, each indicative of different data elements in process for placement into the cache by the cache mechanism;
receiving, at a subsequent time, a second request to load the data element;
checking, in response to the second request, the data element against the cache; and
determining that the data element is available in the cache, wherein the data element was loaded in the cache during the preemptive caching step.

2. The method according to claim 1, further comprising: loading, in response to the subsequent request, the data element from the cache.

3. The method according to claim 1, further comprising:
causing the cache mechanism to check the element against the queue; and
wherein upon a determination that the data element does not exist in the queue, causing the data element to be added to the queue.

4. The method according to claim 3, wherein a determination that the element does exist in the queue occurs after the data element has previously been (i) attempted to be accessed from the cache, (ii) determined not to be stored in the cache, and (iii) accessed from the application database.

5. The method according to claim 1, wherein loading the data element from the application database is slower than loading the data element from the cache.

6. The method according to claim 1, wherein each of the different data elements in the queue was previously checked against the queue before being added to the queue.

7. The method according to claim 1, wherein each of the different data elements in the queue are in process to be placed in the cache but not yet in the cache.

8. An apparatus comprising at least one processor and at least one memory including computer program code, the at least one memory and the computer program code configured to, with the processor, cause the apparatus to at least:
receiving, from a client device, at a first time, a request to load a data element;
checking the data element against a cache;
in response to determining that the data element is not available in the cache:
(1) accessing the data element from an application database; and transmitting an element to the client device, the element being responsive to the request from the client device for the data element, the data element having been (i) attempted to be accessed from the cache, (ii) determined not to be stored in the cache, and, (iii) accessed from the application database; and
(2) preemptive caching, wherein preemptive caching comprises: subsequent to determining that the data element is not available in the cache and in parallel to the accessing and transmitting steps, transmitting, to a cache mechanism, an indication that the data element is unavailable in the cache, the indication configured to cause an identifier key to be added to a queue, the queue stored in the cache mechanism, causing the data element to be queued for retrieval from the application database and later stored in the cache, the queue being a list of one or more other identifier keys, each indicative of different data elements in process for placement into the cache by the cache mechanism;

receiving, at a subsequent time, a second request to load the data element;

checking, in response to the second request, the data element against the cache; and determining that the data element is available in the cache, wherein the data element was loaded in the cache during the preemptive caching step.

9. The apparatus according to claim 8, wherein the at least one memory and the computer program code are further configured to, with the processor, cause the apparatus to:

receiving a second request to load the data element; and loading, in response to the subsequent request, the data element from the cache.

10. The apparatus according to claim 8, wherein the at least one memory and the computer program code are further configured to, with the processor, cause the apparatus to:

causing the cache mechanism to check the element against the queue; and wherein upon a determination that the data element does not exist in the queue, causing the data element to be added to the queue.

11. The apparatus according to claim 10, wherein a determination that the element does exist in the queue occurs after the data element has previously been (i) attempted to be accessed from the cache, (ii) determined not to be stored in the cache, and (iii) accessed from the application database.

12. The apparatus according to claim 8, wherein loading the data element from the application database is slower than loading the data element from the cache.

13. The apparatus according to claim 8, wherein each of the different data elements in the queue was previously checked against the queue before being added to the queue.

14. The apparatus according to claim 8, wherein each of the different data elements in the queue are in process to be placed in the cache but not yet in the cache.

15. A computer program product comprising at least one non-transitory computer-readable storage medium having computer-executable program code instructions stored therein, the computer-executable program code instructions comprising program code instructions for:

receiving, from a client device, at a first time, a request to load a data element;

checking the data element against a cache;

in response to determining that the data element is not available in the cache:

accessing the data element from an application database; and transmitting an element to the client device, the element being responsive to the request from the client device for the data element, the data element having been (i) attempted to be accessed from the cache, (ii) determined not to be stored in the cache, and, (iii) accessed from the application database; and preemptive caching, wherein preemptive caching comprises:

subsequent to determining that the data element is not available in the cache and in parallel to the accessing and transmitting steps, transmitting, to a cache mechanism, an indication that the data element is unavailable in the cache, the indication configured to cause an identifier key to be added to a queue, the queue stored in the cache mechanism, causing the data elementto be queued for retrieval from the application database and later stored in the cache, the queue being a list of one or more other identifier keys, each indicative of different data elements in process for placement into the cache by the cache mechanism; and transmitting an element to the client device, the element being responsive to the request from the client device for the data element, the data element having been (i) attempted to be accessed from the cache, (ii) determined not to be stored in the cache, and, (iii) accessed from the application databases;

receiving, at a subsequent time, a second request to load the data element;

checking, in response to the second request, the data element against the cache; and determining that the data element is available in the cache, wherein the data element was loaded in the cache during the preemptive caching step.

16. The computer program product according to claim 15, wherein the computer-executable program code instructions further comprise program code instructions for:

loading, in response to the subsequent request, the data element from the cache.

17. The computer program product according to claim 15, wherein the computer-executable program code instructions further comprise program code instructions for:

causing the cache mechanism to check the element against the queue; and wherein upon a determination that the data element does not exist in the queue, causing the data elementto be added to the queue.

18. The computer program product according to claim 17, wherein a determination that the element does exist in the queue occurs after the data element has previously been (i) attempted to be accessed from the cache, (ii) determined not to be stored in the cache, and (iii) accessed from the application database.

19. The computer program product according to claim 17, wherein loading the data element from the application database is slower than loading the data element from the cache.

20. The computer program product according to claim 17, wherein each of the different data elements in the queue was previously checked against the queue before being added to the queue.

21. The computer program product according to claim 17, wherein each of the different data elements in the queue are in process to be placed in the cache but not yet in the cache.

* * * * *